July 10, 1951 C. O. SLEMMONS 2,560,307
BAND AND PULLEY STRUCTURE
Filed April 25, 1946
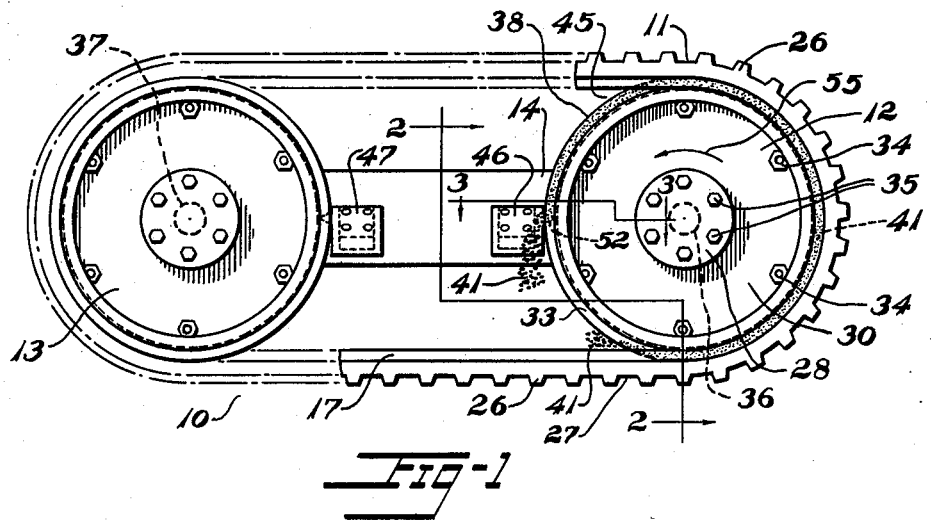
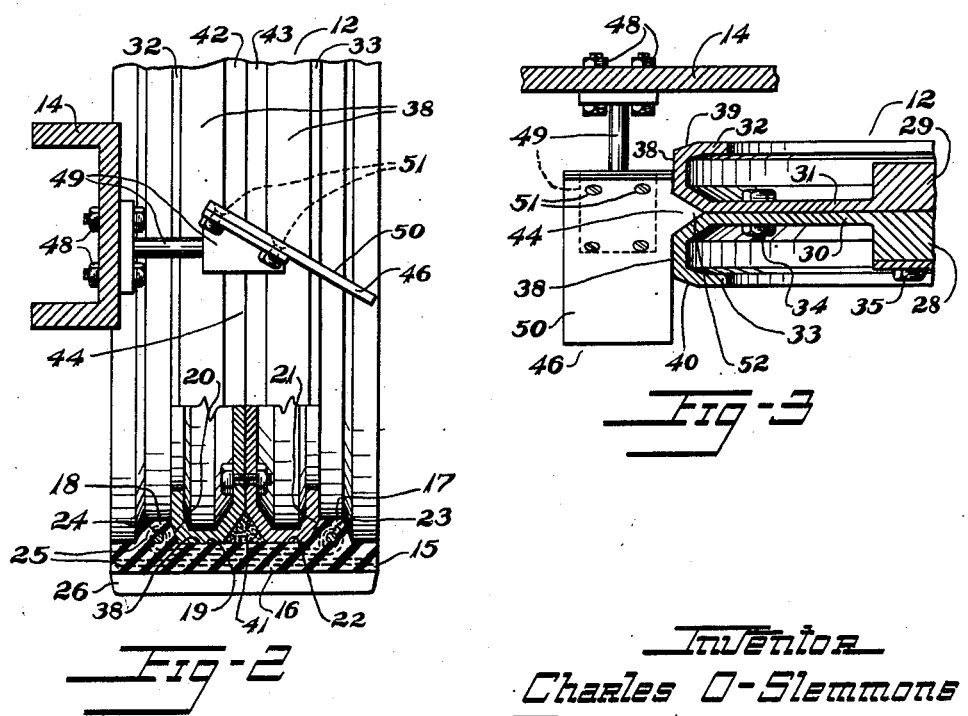
Inventor
Charles O. Slemmons
By
Atty.

Patented July 10, 1951

2,560,307

UNITED STATES PATENT OFFICE 2,560,307

BAND AND PULLEY STRUCTURE

Charles O. Slemmons, South Bend, Ind., assignor to The B. F. Goodrich Company, New York, N. Y., a corporation of New York Application April 25, 1946, Serial No. 664,831

2 Claims. (Cl. 305—8)

1

The invention relates to band and pulley structures and especially to bands and pulleys for track assemblies of self-laying track type vehicles. The invention in some of its aspects is also useful for belt power transmission and other purposes.

Objects of the invention are to provide an improved friction drive; to provide for maintaining effectively a high degree of traction between a band and a pulley; to provide for reducing slippage between the band and pulley; to provide for maintaining the contacting surfaces of the band and pulley substantially free of foreign material; to provide for laterally gripping a portion of the pulley rim by side portions of the band while conducting flowable foreign material away from the space between the band and pulley; to provide for removing the flowable foreign material; and to provide for continuity of cleaning action, reliability and effectiveness of operation.

These and other objects and advantages of the invention will be apparent from the following description.

In the accompanying drawings which form a part of this specification and in which like numerals are employed to designate like parts throughout the same, Fig. 1 is a side elevation of an endless band track assembly constructed in accordance with and embodying the invention, parts being broken away, Fig. 2 is a sectional view taken along line 2—2 of Fig. 1, and Fig. 3 is a sectional view taken along line 3—3 of Fig. 1, parts being broken away.

In the illustrative embodiment of the invention shown in the drawing, the transmission 10 has an endless band or track 11 adapted to contact the ground for purposes of motion, the track extending about spaced-apart pulleys or wheels 12, 13 supported on a suitable frame member 14 of a track type vehicle, either or both wheels being power driven. The band or track 11 includes a body 15 of resilient rubber or other rubber-like material having a circumferentially-extending portion 16, which portion has a pair of generally radially disposed upright ridges or ribs 17, 18 on its inner pulley contacting or working surface spaced-apart transversely of the track and extending circumferentially or longitudinally substantially parallel to one another throughout their extent about the entire periphery of the inner surface of the track. The ribs or ridges 17, 18 define between them a continuous valley-like depression 19 having steeply inclined convergent

2 sidewalls 20, 21 facing each other and a bottom wall 22, the walls of the depression providing a working surface of rubber material engageable with the pulley.

A pair of endless wire cable reinforcements 23, 24 of substantially inextensible material, preferably of grommet construction having wire wound upon itself in full circle convolutions, are embedded in the rubber material of the body 15 at the ribs 17, 18, as shown especially in Fig. 2. The cable reinforcements 23, 24 are preferably disposed with their centers of cross-section in alignment with or above the bottom wall 22 of the valley-like depression 19 for facilitating a laterally inward pressing action of the ribs toward one another at the sidewalls 20, 21 and against each pulley or wheel of the transmission 10, when the band 11 engages the peripheral face of each wheel. Layers 25, 25 of relatively non-stretchable material such, for example as, woven fabric or laterally extending cords are preferably disposed in the rubber of the circumferential portion 16 with one or more layers looped about the cable reinforcements 23, 24 providing with the cables a hammock-like arrangement in cross-section laterally of the band 11 thereby facilitating anchoring the cables in the desired spaced-apart relation in the ribs and resisting lateral spreading of the ribs 17, 18 under tension of the band about the pulleys.

The fabric and rubber parts of the band or track 11 are preferably united as by vulcanization under heat and pressure. The band may be provided with corrugations 26, 26 or other suitable tread configuration at its outer or ground-contacting face 27 for effecting the desired transmission of traction force with minimum slippage between the ground and the track 11.

The construction and mounting of each pulley or wheel may be the same, hence only the drive pulley 12 and its mounting, as shown in the drawings, will be described in detail. The pulley 12 may be of right and left hand members each having a hub 28, 29, a web 30, 31 extending radially outward from the hub, and a peripheral rim 32, 33, the respective members being bolted or suitably secured together as at 34, 34 with the webs 30, 31 in abutting relation providing a complete pulley assembly mounted at the hub 28, 29 in a suitable manner as by bolts 35, 35 on an axle 36, 37. The respective rims 32, 33 of the pulley 12 in combination form a circumferentially continuous, transversely or axially extending base portion 38 of the peripheral face of the pulley adapted to engage the inner or working surface of the bottom wall 22 of the track. Radially and circumferentially extending outer side portions 39, 40 of the rims 32, 33 are steeply, oppositely, and convergingly inclined relative to one another, and are adapted to engage frictionally the working surfaces of the correspondingly steeply inclined sidewalls 20, 21 of the band at the ribs 17, 18.

It has been found that objectionable flowable foreign material 41 such, for example, as snow, mud, dirt, sand and other loose material tends to accumulate and become compacted between the working surfaces of the band and the face of the pulley; thus diminishing direct frictional contact between the band and the pulley, which condition tends to cause objectionable slippage and reduced effectiveness of the transmission. To the end of overcoming these and other difficulties, the rims 32, 33 have radially and circumferentially extending inner side portions 42, 43, which portions are oppositely and convergingly inclined relative to the base portion 38 defining therein a groove 44 which may be positioned substantially centrally of the base portion 38, as shown especially in Figs. 2 and 3, for accommodating the flowable foreign material 41 therein.

Under movement of the vehicle during rotation of the driving wheel 12 in the direction, for example, as indicated by the arrow at 55, the band or track at its substantially horizontal lower reach at the zone of entry to the pulley seats promptly on the pulley with the base portion 38 of the rim seating on the working surface of the bottom wall 22 of the valley-like depression 19 of the band, and driving friction is supplied as a result of the tension of the band about the pulley. The action of the fabric reinforcing layers 25, 25 holding the cables 23, 24 in the desired spaced relation and the tendency of the ribs 17, 18 to approach each other upon longitudinal or circumferential flexing of the wrapped extent of the track about the pulley, by virtue of the hammock-like arrangement of the inextensible cables and relatively non-stretchable fabric layers, and also due to the tensioning of the track acting to flex the margins of the track extending transversely beyond the ribs 17, 18 toward the wheel rim and thereby through a cantilever action forcing the ribs 17, 18 radially inward, all of which coact to cause a lateral pressure of the ribs to be exerted against the outer side portions 39, 40 of the rims 32, 33. The lateral pressure of the ridges increases progressively from the entrance of the lower substantially horizontal reach of the track to the pulley to a zone of greater curvature of the wrapped extent of the band 11 about the pulley, while the resilient rubber material at the pulley contacting or working surface of the band functions to accommodate variation in the surface of the rim or face of the pulley and to increase the area of contact between the band and the pulley facilitating provision of a good grip on the pulley for effective driving action.

The sliding and contacting movement of the ribs 17, 18 across the inclined outer portions 39, 40 of the rim 32, 33 scrapes the exposed working faces of the portions substantially free of mud. The pressing action of the bottom wall 22 of the valley-like depression 19 due to band tension and flexing tends to squeeze the mud from between the adjacent faces of the band and the pulley and to shift the mud or flowable material to the peripheral groove 44. The groove 44 accommodates the mud and permits the latter in a compacted form to travel with the pulley and band to an upper region of the pulley at 45 and at the upper substantially horizontal reach of the band, thereby facilitating frictional engagement between the peripheral contacting surfaces of the band and pulley at each side of the groove 44 for effective traction purposes.

At the upper region at 45 some mud may be thrown free from the groove 44, but due to its compacted form the mud to a large measure may remain disposed within the groove and continue to rotate with the pulley, thereby objectionably restricting the space for accommodating mud therein. To this end, cleaning means 46, 47 may be mounted adjacent the periphery of the pulley as by bolt fasteners 48, 48 and bracket 49, and constructed and arranged to clean the walls of the groove desirably by scraping, brushing or other suitable positive cleaning action. The cleaning means, in the preferred construction, comprises a deflector-plate-scraper structure 50 of sheet metal secured to the bracket 49 as by screw fasteners 51, 51 and disposed at an angle relative to the axis of rotation of the wheel, as shown especially in Fig. 2. The structure 50 has a scraper element or nib 52 of metal extending outwardly from one side in register with the groove 44 and of suitable shape for scraping and removing the compacted foreign material 41 still retained in the groove. The loosened foreign material is deflected by the structure 50 to one side of the band 11 and preferably clear of the margins of the latter. In this manner the space of the groove 44 is maintained in open condition for accommodating and receiving flowable foreign material therein at the region of entrance of the band to the pulley, promoting maintenance of effective traction between the band 11 and the pulley 12 for all operating conditions encountered in usage of the vehicle.

The pulley 13 may be constructed and arranged like the pulley 12 and, if desired, the cleaning means or deflector-plate-scraper structure 47 substantially like the structure 50 may be provided at the pulley 13 for cleaning purposes, as shown especially in Fig. 1, especially for the condition of travel of the band in the reverse direction relative to that indicated by the arrow at 55. The respective parts of the transmission 10 thus cooperate in providing for effective operation even under muddy, snowy, sandy and other severe operating conditions.

Variations may be made without departing from the scope of the invention as it is defined in the following claims.

I claim:

1. A band and pulley assembly suited to use in the presence of flowable material, said assembly comprising, in combination, a band including a flexible body of rubber-like material having inner and outer faces and having a valley-like depression extending circumferentially in the inner face with side and bottom walls of said rubber-like material providing a working surface, and said band including laterally spaced-apart substantially inextensible tension-resisting elements extending circumferentially in said body each at a sidewall of said valley-like depression, and reinforcing means including relatively non-stretchable material in said body interconnecting said elements in a hammock-like arrangement resisting lateral spreading of said elements while permitting flexing of the latter elements in the direction radially inward of said inner face under circumferential flexure of said band, and a pulley having a peripheral face of a shape adapted for seating in said depression, and said peripheral face of the pulley having a material guiding and conducting groove therein extending circumferentially thereof, said groove being continuously unobstructed throughout its depth and length along the wrapped extent of the band on the pulley, and providing space for accommodating flowable material therein entering between said band and said pulley and for conducting the flowable material throughout the wrapped extent of said band on said pulley.

2. A band and pulley assembly suited to use in the presence of flowable material, said assembly comprising, in combination, a band including a flexible body of rubber-like material having inner and outer faces and having a valley-like depression extending circumferentially in the inner face with side and bottom walls of said rubber-like material providing a working surface, and said band including laterally spaced-apart substantially inextensible tension-resisting elements extending circumferentially in said body each at a sidewall of said valley-like depression, and reinforcing means including relatively non-stretchable material in said body interconnecting said elements in a hammock-like arrangement resisting lateral spreading of said elements while permitting flexing of the latter elements in the direction radially inward of said inner face under circumferential flexure of said band, and a pulley having a peripheral face of a shape adapted for seating in said depression, said peripheral face of the pulley having a material guiding and conducting groove therein extending circumferentially thereof, said groove being continuously unobstructed throughout its depth and length along the wrapped extent of the band on the pulley and providing space for accommodating flowable material therein entering between said band and said pulley at one end of said wrapped extent and for conducting the flowable material throughout said wrapped extent of said band on said pulley to a position for removal at the other end of said wrapped extent, and cleaning means comprising an element disposed in and substantially conforming to the cross-section of said groove at said position for removing the conducted material from said groove.

CHARLES O. SLEMMONS.

REFERENCES CITED

The following references are of record in the file of this patent:

UNITED STATES PATENTS

| Number | Name | Date |
|---|---|---|
| 263,566 | Nixon | Aug. 29, 1882 |
| 307,503 | Thomas | Nov. 4, 1884 |
| 1,216,962 | Desmarais | Feb. 20, 1917 |
| 1,355,540 | Cox | Oct. 12, 1920 |
| 1,400,100 | Reddaway | Dec. 13, 1921 |
| 1,774,835 | Lombard | Sept. 2, 1930 |
| 2,290,109 | Mayne | July 14, 1942 |
| 2,412,122 | Campbell | Dec. 3, 1946 |

FOREIGN PATENTS

| Number | Country | Date |
|---|---|---|
| 134,190 | Great Britain | Nov. 13, 1919 |